Sept. 5, 1939.　　　G. STEINLEIN ET AL　　　2,171,810
MOTOR DRIVEN FREEWHEEL BRAKE HUB FOR BICYCLES
Filed Feb. 8, 1938　　　4 Sheets-Sheet 1

Inventors
Gustav Steinlein
and
Ludwig Bruckmann
by
Dean Fairbank & Hirsch

Sept. 5, 1939.  G. STEINLEIN ET AL  2,171,810
MOTOR DRIVEN FREEWHEEL BRAKE HUB FOR BICYCLES
Filed Feb. 8, 1938  4 Sheets-Sheet 3

Inventors
Gustav Steinlein
and
Ludwig Bruckmoser
by
Dean Fairbank & Hirsch

Sept. 5, 1939.     G. STEINLEIN ET AL     2,171,810
MOTOR DRIVEN FREEWHEEL BRAKE HUB FOR BICYCLES
Filed Feb. 8, 1938     4 Sheets-Sheet 4

Inventors
Gustav Steinlein
and
Ludwig Bruckmoser
by
Dunn Faurbach & Hirsch

Patented Sept. 5, 1939

2,171,810

UNITED STATES PATENT OFFICE 2,171,810

MOTOR DRIVEN FREEWHEEL BRAKE HUB FOR BICYCLES

Gustav Steinlein, Forsthaus, Mainberg, near Schweinfurt, and Ludwig Bruckmoser, Schweinfurt, Germany Application February 8, 1938, Serial No. 189,420
In Germany February 19, 1937

8 Claims. (Cl. 180—30)

This invention relates to a free-wheel brake hub for a bicycle driven by a motor mounted in the driving wheel thereof, the reacting torque of which motor is transmitted to the frame by a resilient member. According to the invention the brake reaction receiving lever or arm of the free-wheel brake hub serves at the same time as a receiving and transmitting member for the resiliently reacting torque of the engine.

Apart from the simplification thereby attained in the construction, and from the advantage of the solution as regards space, this arrangement has the further advantage that when the rear wheel has to be removed there are far fewer connections to be released than with known devices of this nature. There is no risk of the strength of the stressed part of the frame or of the lever being endangered by the two-fold stress acting in opposite directions, because the torques produced by the engine, in all the usual power-driven vehicles, are less than the torques produced in the braking. Furthermore with this combination there is also associated a saving in weight.

The invention consists in the feature that the sprung member that transmits the reacting torque from the engine or its casing to the frame is combined with a non-rotatably secured part of the brake, while all the torques taken up by this part of the brake are transmitted by the usual brake arm to a frame tube, other protective means also being employed for this purpose, if desired, and being attached for instance to the fork end of the vehicle.

With this arrangement there may also be provided, besides the resilient reception of the torques, a damping of further forces, means being interposed for instance which damp the oscillations by friction, cushioning or other resistances.

In the accompanying drawings, which form a part of this specification, by way of example several embodiments of the invention are illustrated.

Figure 1:
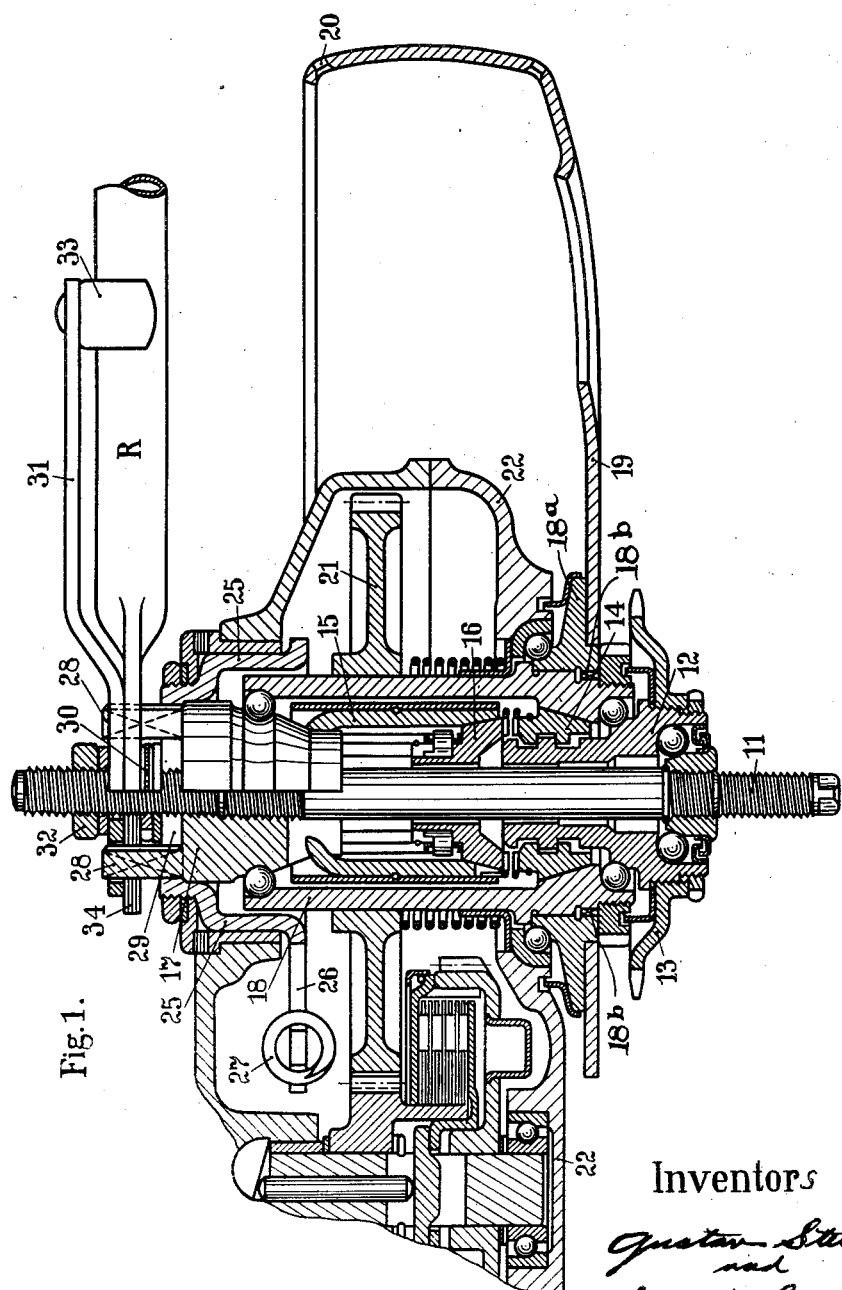
Fig. 1 is a horizontal axial sectional view of the free-wheel hub with brake, partially showing the relatively rotatable gear casing of the driving engine mounted in the vehicle wheel.

In the axial section according to Figure 1 is represented a known construction of a free-wheel hub with back-pedalling brake, wherein there is mounted upon the wheel axle 11 a driving body 12, which carries the chain-driven sprocket wheel 13 for the pedal crank drive.

The free-wheel clutch consists of a coupling sleeve 14, capable of being screwed upon the driving body, while the brake is formed by a lengthwise slit sleeve-like body 15, which can be expanded by a slidable expanding cone 16 and a stationary expanding body 17 in known manner shown and described in the Winkler Patent No. 2,066,504 issued January 5, 1937. This expanding body 17 forms a stationary part of the back-pedalling brake and is non-rotatably connected to the brake sleeve 15. This arrangement is located in the hub bush or sleeve 18, which is rotatable by means of ball bearings upon the driving body 12 and the expanding body 17.

Upon the hub bush 18 a dish-shaped carrier 19 is so mounted as to prevent relative rotation, and in the outer periphery of this carrier the spokes of the wheel are inserted in apertures 20. Upon the hub bush 18 is also rigidly secured a toothed wheel 21, which forms with other toothed wheels and clutches, the change-speed gear, which is only partially represented, and by means of which the drive is transmitted from the engine, not shown, to the hub bush 18. The drive is transmitted from the hub bush 18 to the driving wheel through the bearing member 18a, which is keyed at 18b to said bush, and which is fixed to the carrier 19 of said driving wheel. The change-speed gear 21 is enclosed in a gear casing 22, rigidly connected with the engine and rotatable upon the hub bush.

Figure 2:
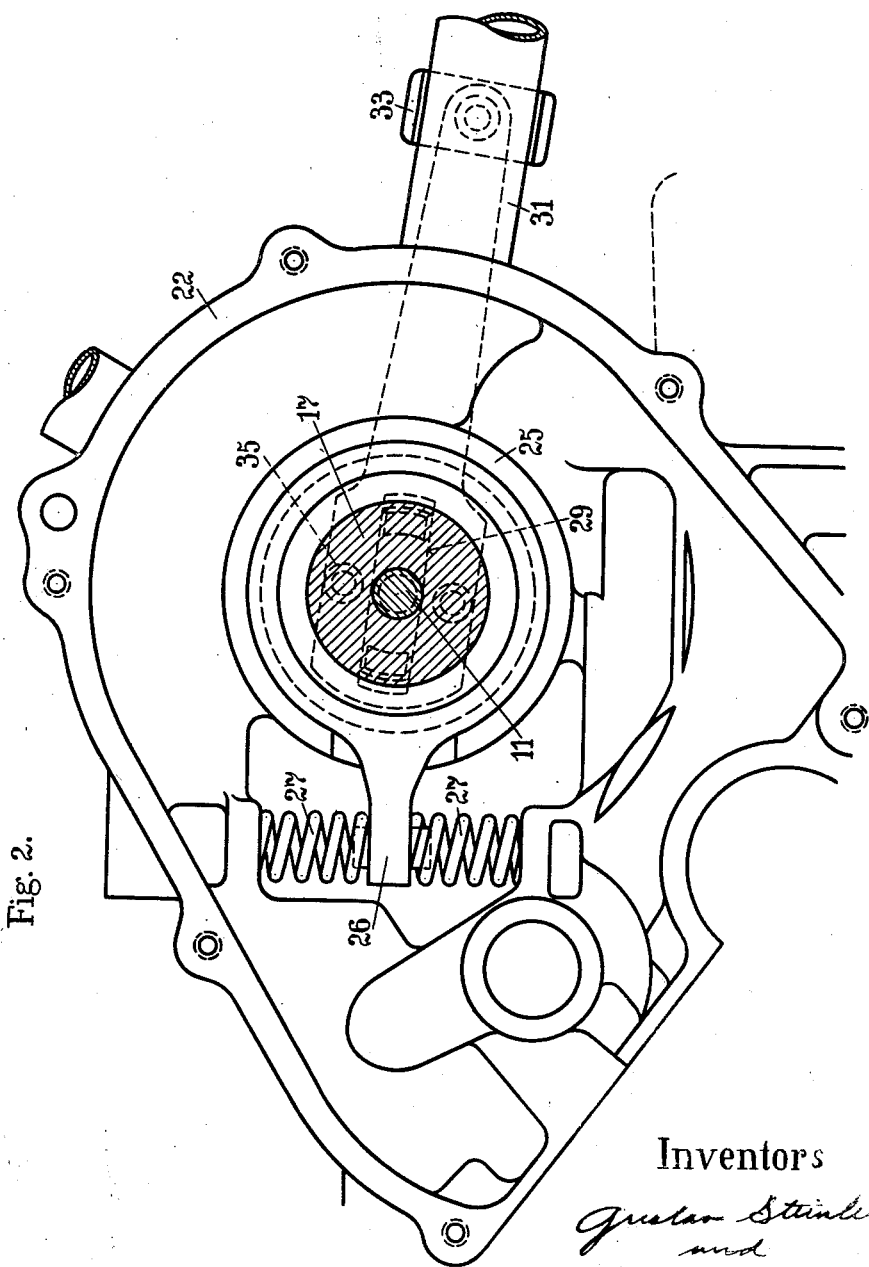
Fig. 2 is an inside view of the cover of the gear casing and a sectional elevation of the bearing cone and the wheel axle.

With such an arrangement the reaction torque of the drive must be transmitted from the engine block to the vehicle frame. For this purpose an arm 26 extends from a bell-shaped body 25, rigidly secured upon the bearing and expanding body 17, into the gear casing, where it is supported in both directions of rotation by springs 27, as shown in Figures 1 and 2. In this way the oscillations of the engine block and the reaction torque of the drive are transmitted by the springs 27, the arm 26 and the body 25 to the body 17, which in its turn is non-rotatably connected with the frame. The connection of the bearing cone with the frame, in the embodiment illustrated by way of example, is established by pin-like or prismatic projections 28 projecting outwards from the bearing cone 17, upon which projections the bell-shaped body 25 is mounted by means of a slot 29, and held fast by a nut 30 on the bearing cone, while the non-rotatable securing of the bearing cone to the vehicle frame is effected by the pin-like projections 28 extending through the slot in the rear fork end 34 into a slot in a power transmitting member in the form of an arm 31, which transmits the torque further. The arm 31 is firmly locked upon the axle 11 by an axle nut 32, along with the other members. Its free end embraces a frame tube R with a double claw 33.

This fastening arrangement presents advantages in various respects. The lever 31, with this arrangement, has to transmit not only the braking torque in back-pedalling but also the reaction torque of the drive to the vehicle frame R. On grounds of space it is often not possible to lodge this lever directly on the bearing cone inside the rear fork. This new arrangement therefore provides for locating the lever outside the rear fork, and employs for this purpose strong projections 28, which pass through all parts to be interconnected with the bearing cone. With this arrangement it is very simple to take out the rear wheel, because after loosening the axle nuts and removing the arm 31, the axle admits of being simply drawn out of the slots in the ends of the fork.

Figure 3:
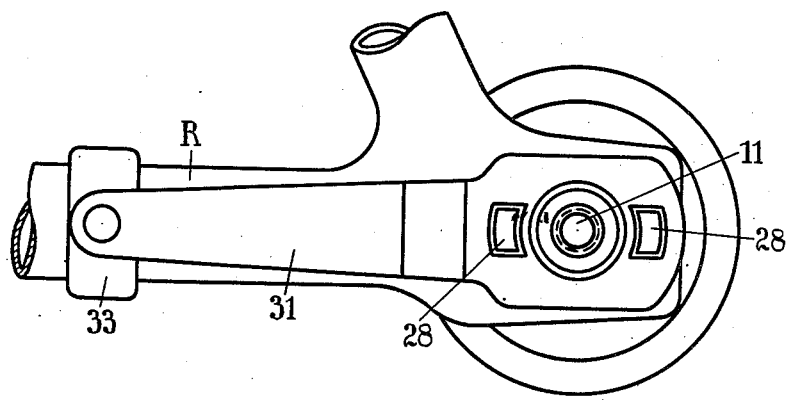
Fig. 3 is an outside view of the arm for immobilising the parts to be protected against rotation, in its position in relation to the frame fork and to the hub.
Figure 4:
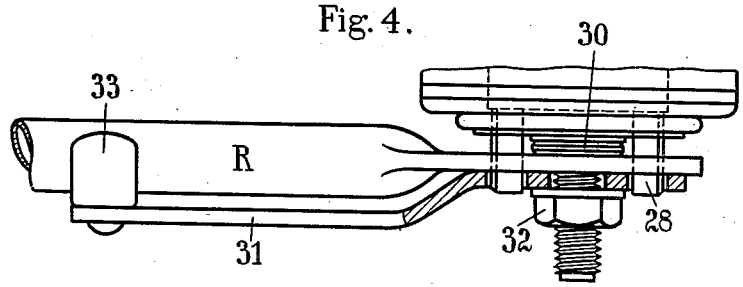
Fig. 4 is a top plan view, partially in section, of the engagement of this arm with the parts to be interengaged.

This pin connection may also be constructed in various other ways, for instance instead of the longitudinal slot in the head of the lever 31, suitable perforations may be made for the projections 28 and the axle 11, as illustrated in Figures 3 and 4. Furthermore, for the better securing of the bell 25 upon the bearing cone 17, the usual axle nut 30 may serve, together with a locking disc or washer, and the bell, as indicated by dotted lines in Figure 2, may besides be secured to the bearing cone by screws 35.

Figure 5:
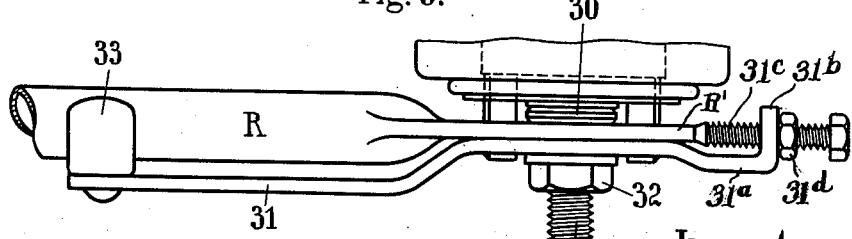
Fig. 5 shows in plan a modified construction, in which the lever is at the same time constructed as a chain-tensioning appliance.

Figure 5 also illustrates the lengthening of the head of the lever 31 to enable this part to be used as a chain-tensioning appliance. In this construction, the end of the extension 31a of the lever 31 is offset at right angles at 31b, and the screw bolt 31c is threaded therethrough and bears against the head R' of the frame R. This screw bolt 31c may be secured in position by a locking nut 31d. By means of this arrangement, the axle 11 carrying the chain-driven sprocket wheel 13 may be moved in the longitudinal slot of the frame head R', thereby tensioning or loosening the driving chain.

Figure 6:
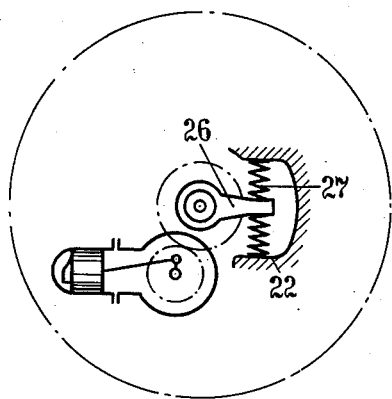
Fig. 6 illustrates diagrammatically the device for resiliently receiving and transmitting the reacting torques of the engine, and corresponds approximately to Figure 2.

Figure 6 shows diagrammatically the arrangement of the engine in relation to the hub and to the spring device according to Figure 2.

Figure 7:
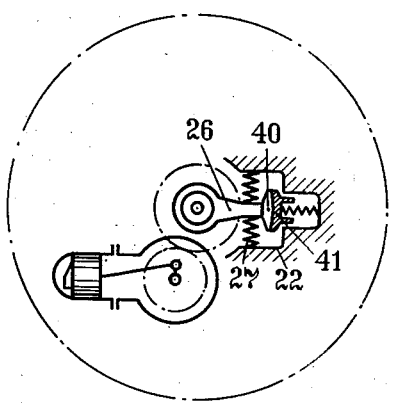
Figs. 7, 8 and 9 are diagrammatic representations of auxiliary means of a progressively damping character, which may be adopted in combination with the spring means.
Figure 8:
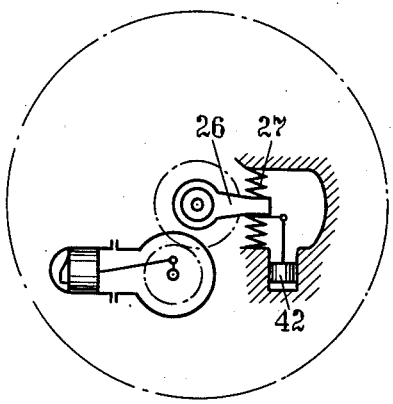
Figure 9:
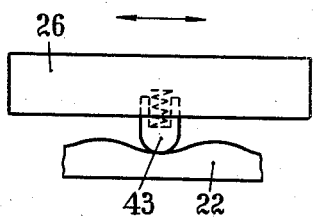

Figures 7, 8 and 9 illustrate the employment of an auxiliary means of a progressively damping character for promoting resilient transmission.

Figure 7 illustrates a frictional appliance between the sprung lever 26 and the gear casing 22. Here, in addition to the two springs 27, there is provided at the end of the lever 26 a yoke 40, which acts against a friction surface 41 pressed resiliently against it. Figure 8 represents the spring device 27 in combination with an air cushion device 42 having a plunger connected to the lever 26, said device being located in the casing 22 with said spring device. This device 42 acts as a shock absorber to assist the springs 27 and may be of the liquid type instead of the air type. Figure 9 shows a device similar to that of Figure 7, in which a resiliently supported friction body 43 arranged upon the side surface of the lever 26 bears on a recessed place in the wall of the gear casing 22 for example, and is moved along the latter as the lever oscillates.

The invention is not limited to the details described and illustrated, modifications being admissible in various respects. For instance the connection between the bearing cone and the transmission arm may be maintained by other means. Moreover the mounting of the engine may be carried out in conjunction with some other free-wheel brake hub.

We claim:

1. A free-wheel brake hub driven by a motor mounted in the driving wheel of a bicycle, the said free-wheel brake hub being arranged upon the driving-wheel axle, in combination with a casing receiving the driving motor with a power transmitting gear and the said free-wheel brake hub and being relatively rotatably supported on the hub shell thereof, a brake part stationarily fixed on the wheel axle and capable of sustaining the reaction stress of the brake, means located in said casing and adapted to resiliently transmit the reacting torque of the motor and shocks in either direction on said stationary brake part, and a member respectively engaged with the said stationary brake part and the bicycle frame, thus at the same time transmitting all stresses from the stationary brake part to the vehicle frame.

2. A driving wheel of a motor bicycle comprising a free-wheel brake hub mounted on the axle thereof, in combination with a casing relatively rotatable on the hub shell and enclosing the motor, means for driving and braking the hub shell through the pedals, and a gear transmitting the drive from the motor to the hub shell, a brake body stationarily fixed on the wheel axle and receiving the reaction force of the brake effect, a member rigidly attached to said brake body and extending into the interior of said casing, resilient means located in the casing between said member and abutments of the casing and adapted to transmit the reactive torque of the motor onto said member, and an arm likewise rigidly attached to the said brake body and devised to transmit both the reaction stress of the brake and the torque reaction of the motor to a frame element.

3. A free-wheel brake hub interconnected with a motor mounted in the driving wheel of a bicycle, the said free-wheel brake hub being arranged upon the driving-wheel axle, the combination with a casing receiving the driving motor with a power transmitting gear and the said free-wheel brake hub and being rotatably supported on the hub shell thereof, a brake part stationarily fixed on the wheel axle and capable of sustaining the reaction stress of the brake, means adapted to resiliently transmit the reactive torque of the motor to the said stationary brake part, a member respectively engaged with the said stationary brake part and the vehicle frame, thus at the same time transmitting all torque stresses from said stationary brake part to the vehicle frame, and chain-tensioning means provided upon said member.

4. A free-wheel brake hub driven by a motor mounted in the driving wheel of a bicycle, in combination with a casing receiving the motor and the said free-wheel brake hub, a stationary part of the brake receiving the reaction of the braking effect, principal means adapted to resiliently transmit the reactive torque of the motor to the said stationary part of the brake, auxiliary means of a progressively damping character for promoting resilience additionally to the operation of said principal means, and a power transmitting member respectively engaged with the vehicle frame and the said stationary brake part, all stresses thus being transmitted from said stationary part to the bicycle frame by a common element.

5. A free-wheel brake hub driven by a motor mounted in the driving wheel of a bicycle, the said free-wheel brake hub being arranged upon the driving-wheel axle, the combination with a casing receiving the driving motor with a power transmitting gear and the said free-wheel brake hub and being rotatably supported on the hub shell thereof, a brake part stationarily fixed on the wheel axle and capable of sustaining the reaction stress of the brake, principal means adapted to resiliently transmit the reactive torque of the motor to the said stationary brake part, auxiliary means of a progressively damping character additionally co-operating with the said principal resilient means, both means being located in said casing, and a member respectively engaged with the said stationary brake part and the vehicle frame, thus at the same time transmitting all torque stresses from said stationary brake part to the vehicle frame.

6. In a bicycle having a vehicle frame, and a motor for driving said bicycle, a free-wheel brake hub mounted on the driving wheel of the bicycle, and having a stationary brake part receiving the braking reaction upon application of the brakes, means for resiliently transmitting the reactive torque of the motor to said stationary brake part, and a power transmitting member between said stationary brake part and said vehicle frame, and separate from said motor, for transmitting the brake reactive stresses and the motor torque reactive stresses from said stationary part to said vehicle frame.

7. In a bicycle having a vehicle frame, and a motor for driving said bicycle in combination, a free-wheel brake hub mounted on the driving wheel of the bicycle, and having a stationary brake part receiving the brake reactive stresses upon application of the brakes, a casing enclosing said motor and said free-wheel brake hub, and receiving the reactive torque stresses of the motor, means for resiliently transmitting the reactive torque stresses of the motor from said casing to said stationary brake part, and a power transmitting member between said stationary brake part and said vehicle frame, and separate from said motor, for transmitting the brake reactive stresses and the motor torque reactive stresses from said stationary part to said vehicle frame.

8. In a bicycle having a vehicle frame, and a motor for driving said bicycle in combination, a free-wheel brake hub mounted on the driving wheel of the bicycle, and having a stationary brake part receiving the brake reactive stresses upon application of the brakes, a casing enclosing said motor and said free-wheel brake hub, and supported for rotation about the axis of said free-wheel brake hub, said casing receiving the reactive torque stresses of the motor, means for resiliently transmitting the reactive torque stresses of the motor from said casing to said stationary brake part, and a power transmitting member between said stationary brake part and said vehicle frame and separate from said motor, for transmitting the brake reactive stresses and the motor torque reactive stresses from said stationary part to said vehicle frame.

GUSTAV STEINLEIN.
LUDWIG BRUCKMOSER.